United States Patent [19]

Freyler

[11] 4,010,940
[45] Mar. 8, 1977

[54] TELESCOPIC SHOCK ABSORBER

[76] Inventor: Adalbert Freyler, Tulpenstrasse 17, 56 Wuppertal, Germany

[22] Filed: Aug. 5, 1975

[21] Appl. No.: 602,101

[30] Foreign Application Priority Data

Aug. 14, 1974  Germany .......................... 2438978

[52] U.S. Cl. .............................. 267/9 B; 267/64 R; 267/63 R; 267/61 R; 188/129; 267/153
[51] Int. Cl.² .......................................... F16F 11/00
[58] Field of Search ............. 267/9 C, 9 B, 9 R, 35, 267/64, 63 R, 153, 152, 61; 188/271, 129, 1 B; 293/1, 60, DIG. 2; 213/45

[56] References Cited

UNITED STATES PATENTS

| | | | |
|---|---|---|---|
| 1,700,133 | 1/1929 | Kreissig | 267/61 R |
| 1,703,222 | 2/1929 | Brimm, Jr. | 267/63 R |
| 3,382,955 | 5/1968 | Deyerling | 188/129 |
| 3,424,448 | 1/1969 | Chak Ma | 267/64 R |
| 3,614,084 | 10/1971 | Brown | 267/153 |
| 3,713,516 | 1/1973 | Freyler | 188/129 |
| 3,738,633 | 6/1973 | Pineau | 267/63 R |

Primary Examiner—James B. Marbert
Attorney, Agent, or Firm—Bacon & Thomas

[57] ABSTRACT

A telescopic shock absorber having means in the slide path of the piston rod for producing resistance to sliding and braking of the return movement of the rod including a plurality of compressible spheres with expansion and centering rings positioned between the spheres. Also included are a pair of slanting brake discs secured to the rod, as well as a slanting wedge positioned therebetween.

14 Claims, 1 Drawing Figure

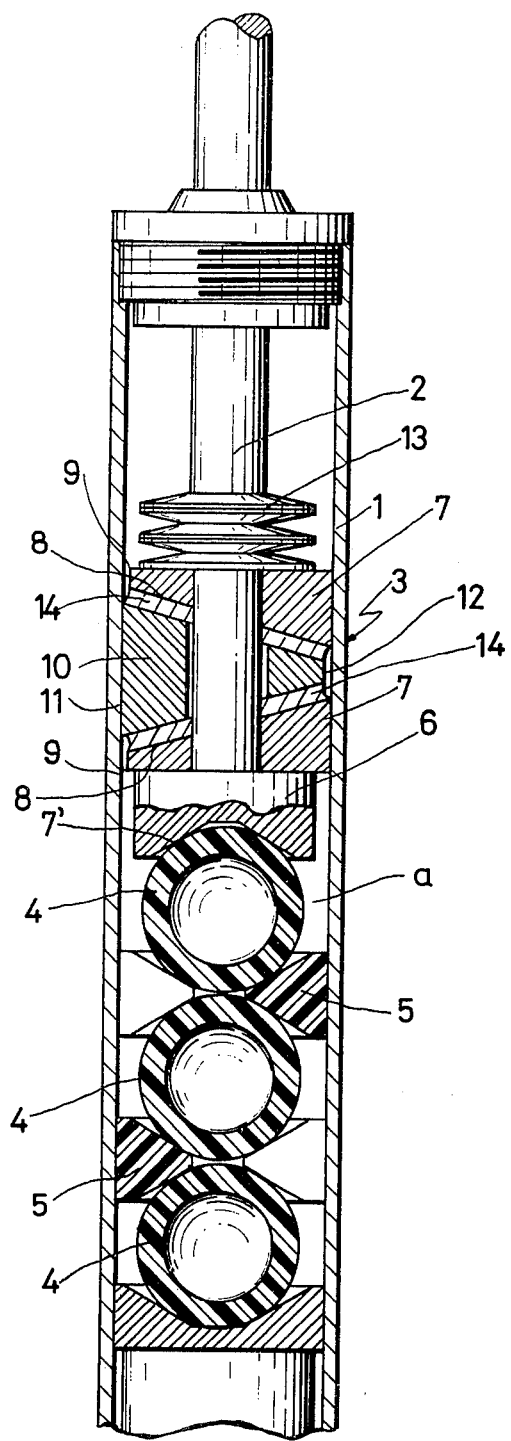

TELESCOPIC SHOCK ABSORBER

BACKGROUND OF THE INVENTION

1. Field of the Invention

The invention relates to a telescopic shock absorber, particularly to a shock absorber operating by compression, or shock absorption through the use of air cushions, and is primarily applicable to motor vehicles having parts which need to be cushioned relative to one another. The shock absorber is of the type wherein a cylinder-shaped tube is attached to one part of the vehicle, the tube containing a tight, sliding shock damping assembly, and being connected to another part of the vehicle by a rod, the assembly exerting a braking action between the relative parts.

2. Description of the Prior Art

For the purpose of producing shock absorption particularly applicable to motor vehicles, several approaches are known besides shock absorption through liquid media. The designs are intended to overcome the disadvantages inherent in shock absorbers operating on liquid media. In an existing design, for instance, the piston is shaped as an expanding piston with a conical part meshing with a corresponding, sliding, hollow-conical part of the piston, with their bases facing forward.

Another design provides an arrangement of sectors that act as braking elements upon a piston shaped as a truncated cone, its base inserted to face forward, with the sectors held under pressure provided by springs supported by the rod.

The rod is pushed against the truncated cone as the sectors slide towards it. All these proposals are more or less complicated, wasteful, and comparatively expensive to manufacture. Their operation is based primarily on friction which in its operation will generate heat that may have a detrimental effect on the component parts of the shock absorber. Also, the desirable progressiveness of the shock absorption effect is achieved only partially. Reference is also made to Freyler, U.S. Pat. No. 3,713,516 which illustrates a prior art telescopic shock absorber wherein the plunger inside the cylinder is split along an oblique separation line.

SUMMARY OF THE INVENTION

The invention focuses mainly on the task of producing a shock absorber of the general type mentioned above which excels through its particular simplicity of design, sturdiness, longlasting serviceability and precise adjustability over a wide range. It also possesses the desirable sequentially progressive effectiveness.

The invention solves this task by providing, in the slide path between the piston rod and the cylinder, tube layers of either solid, or preferentially, hollow spheres made of an elastic material such as rubber or plastic which exert a resistance to the sliding motion as well as furnish the power to return the piston to its basic position as determined by the resilience of the compressible bodies. Furthermore, expanding centering rings are placed between successive layers which pass the pressure exerted on the layers on to the interior of the cylinder tube. These rings are tightly connected on their inside to the piston rod, while their outsides adhere to the inner wall of the cylinder tube. The diameter of the compression units, or spheres, is slightly less than that of the tube.

Through the invention a shock absorber of greatest possible efficiency and most favorable shock absorption characteristics has has been created which is especially suited to motor vehicles. Its action is basically similar to that of a gas-driven hydraulic shock absorber, without, however, having the disadvantages inherent in existing types of that kind, such as the possible loss of the oil or gas dampening media. In the case of oil, inertia and the slowness in reaction must be taken into consideration which is particularly noticeable when driving on curves, as well as the generation of foam in the oil through constant oscillation. The expanding rings made of plastic or similar materials also act as brake shoes, slowing down the release of the compressing, stored energy when the shock absorber returns to its expanded position.

The device covered by this invention involves, so to speak, a combination of reciprocating shock absorption by friction and compression, with both systems being independently adjustable, and reducing the possibility of malfunction.

More or fewer layers of compression units can be provided, depending upon the requirements set by specific applications.

The invention offers the special advantage that it provides the shock absorber, or its piston rod, with an efficient mechanism for fine adjustment by means of a spring assembly, such as dish springs, which allows for a pre-selected initial stress in the air chamber cushion or compression system.

In the design an adjustable brake mechanism is installed on the piston rod and coordinated with the spring action of the disc springs, acting on the inside of the housing. Such a brake adds to the dampening effect of the shock absorber.

BRIEF DESCRIPTION OF THE DRAWINGS

Additional characteristics and details of design of the invention become obvious in the following description which has reference to the schematic drawing showing an example of the equipment covered under the invention, in a longitudinal view.

DETAILED DESCRIPTION OF THE INVENTION

The drawing is limited to only the parts necessary for an understanding of the invention itself.

The telescopic shock absorber shown consists of a cylindrical tube or housing 1, and a movable piston rod 2, having one of its ends supporting a piston 3, inserted into the housing. The housing is connected at its lower end (not shown in the drawing) to an appropriate portion of the vehicle; wherein, piston rod 2, with an end protruding from the housing 1, is connected to another part of the vehicle.

Inside tube 1, in the area of piston travel, a plurality of compressible pads or air or gas-filled compartments are placed. In the unit shown three layers are provided, but there may be fewer or more of them. The layers shown include a plurality of hollow spheres 4 either made of rubber or plastic material, having a diameter slightly smaller than that of the housing tube. It is possible to use solid spheres made of a suitable elastic material. Between the layers are positioned a pair of slotted, centered, expanding rings 5 having surfaces facing the spheres and being shaped like hollow cones, the tilt angle of the cones being larger than the diameter of the spheres. The expansion rings act as dampers and brakes against the speed of expansion following a shock.

The piston rod end inserted into the tube supports an endpiece 6 having a hollow, conical surface 7' touching on spheres 4. This endpiece 6 also acts as a shoulder stop for piston 3.

Piston 3 is composed of a pair of buffer or brake discs 7 the surfaces of which face each other, and which are slanted relative to one another so as to form a wedge-shaped space that opens vertically. On one side, discs 7 are separated from the tube wall by clearance 9, while on the opposite vertical side they are in contact with the inner wall of the tube. Discs 7 are tightly attached to piston rod 2, without any radial play. between the slanting surfaces of discs 7, a wedge-shaped piece 10 is inserted, its rearside 11 being in close contact with the cylinder wall and its opposite side being separated by a clearance 12 from the inner cylinder wall. Wedge 10 has a radial play on piston rod 1. Between the slanting surfaces of wedge 10 and discs 7 are inserted a pair of discs 14 made of tempered, precisionground steel.

Piston 3 is held under spring tension by a system of dish springs 13, their number determined by the respective requirements of the application. The tension of these springs is likewise adjusted to the respective application, resulting in a progressive braking action on the inner wall of the housing that increases in proportion to the compression of the springs.

The functioning of the shock absorber is as follows: When the absorber is being compressed, as occurs with any jolt, the air cushion chambers 4 are compressed. Their release is slowed down and braked by the expansion rings. Moreover, on the return stroke, the braking action exerted by piston 3 is increased.

According to the invention, the shock absorber also prevents the axles from excessively swinging out beyond their center, a phenomenon caused by high stress, that may, for instance, occur in independent suspension systems.

We claim:

1. A telescopic shock absorber comprising:
   a. a cylindrical tube,
   b. a piston rod extending into said tube, said piston rod having a piston thereon received within said tube and comprising: an endpiece secured to the end of said piston rod; a pair of brake discs slidingly received on said rod inwardly of said endpiece and mounted to have no radial movement with respect to said rod, said brake discs having oppositely directed, confronting slanted surfaces thereon; a wedge received between said brake discs and mounted for radial shifting relative to said rod, said wedge having oppositely directed slanting surfaces on the opposite sides thereof extending generally parallel to the confronting slanted surfaces on said brake discs; and resilient means inwardly of said brake discs for urging said brake discs toward said endpiece; and
   c. means in the slide path of the rod engageable by said endpiece for producing resistance to sliding movement of the rod, including compressible members having a circular cross-section.

2. A telescopic shock absorber as defined in claim 1 wherein said compressible members are a plurality of spheres.

3. A telescopic shock absorber as defined in claim 2 wherein said spheres are hollow.

4. A telescopic shock absorber as defined in claim 2 wherein said spheres are substantially axially alligned.

5. A telescopic shock absorber as defined in claim 4 including an expansion and centering elastic ring being positioned between said alligned spheres.

6. A telescopic shock absorber comprising:
   a a cylindrical tube;
   b a piston rod extending into said tube;
   c means in the slide path of the rod for producing resistance to sliding and braking of the return movement of the rod, including compressible members having a circular cross-section, said compressible members being a plurality of substantially axially aligned spheres; and
   d an expansion and centering elastic ring positioned between each pair of said aligned spheres, wherein said rings have surfaces facing said spheres, said surfaces being in the shape of hollow cones, the tilt angle of the cones being larger than the diameter of said spheres.

7. A telescopic shock absorber as defined in claim 6, including a pair of brake discs slidingly received on said rod and mounted to have no radial movement with respect to said rod, said brake discs having oppositely directed, confronting slanted surfaces thereon, and a slanting wedge positioned between said brake discs surrounding said rod and axially and radially movable relative thereto, said wedge having oppositely directed slanting surfaces on the opposite sides thereof extending generally parallel to the confronting slanted surfaces on said brake discs.

8. A telescopic shock absorber as defined in claim 7, including a pair of second discs, one of said second discs being positioned between each set of confronting slanted surfaces on said brake discs and said wedge.

9. A telescopic shock absorber as defined in claim 7 wherein said discs and wedge have a surface in contact with the wall of said tube and another surface separated a distance from the tube wall.

10. A telescopic shock absorber as defined in claim 7 including spring tension means on said rod urging said brake discs and wedge against an endpiece attached to said piston.

11. A telescopic shock absorber as defined in claim 6 wherein said spheres have a diameter less than the inside diameter of said tube.

12. A telescopic shock absorber as defined in claim 6 including an endpiece on said rod having a hollow, conical surface for receiving the uppermost sphere therein.

13. A telescopic shock absorber as defined in claim 6, wherein said rings are split.

14. A telescopic shock absorber as defined in claim 6, wherein said spheres are hollow.

* * * * *